United States Patent [19]

Mori

[11] Patent Number: 4,618,860
[45] Date of Patent: Oct. 21, 1986

[54] RADIO PAGING METHOD OF ARRANGING MESSAGE INFORMATION WITH REFERENCE TO A KEY CODE AND A BASE STATION AND A PAGER RECEIVER FOR USE IN THE METHOD

[75] Inventor: Toshihiro Mori, Tokyo, Japan

[73] Assignee: NEC Corporation, Tokyo, Japan

[21] Appl. No.: 499,681

[22] Filed: May 31, 1983

[30] Foreign Application Priority Data

| May 31, 1982 | [JP] | Japan | 57-92508 |
| May 31, 1982 | [JP] | Japan | 57-92509 |
| May 31, 1982 | [JP] | Japan | 57-80396[U] |

[51] Int. Cl.$^4$ .............................................. G08B 5/22
[52] U.S. Cl. .......................... 340/825.44; 340/825.48; 455/38
[58] Field of Search ...................... 340/825.04, 825.44, 340/825.48, 311.1; 455/36, 38, 54, 68; 179/2 EC

[56] References Cited

U.S. PATENT DOCUMENTS

| 3,990,046 | 11/1976 | Katz et al. | 340/825.04 |
| 4,313,107 | 1/1982 | Mori | 340/825.48 |
| 4,382,256 | 5/1983 | Nagata | 340/825.44 |

*Primary Examiner*—Donald J. Yusko
*Assistant Examiner*—Sharon L. Hodgkins

*Attorney, Agent, or Firm*—Sughrue, Mion, Zinn, Macpeak & Seas

[57] ABSTRACT

In a radio paging method of transmitting message information from a subscriber's substation (32) through a base station (30) to pager receivers (31) in the form of a radio calling signal, the message information is divided into a plurality of species to which key codes are assigned, respectively. When a selected one of the key codes is indicated from the substation prior to transmission of the message information, the base station sends a request to the substation in compliance with the selected key code to receive, as the message information, a message indicated by the request. The indicated message preceded by the selected key code is carried from the base station to the pager receivers by the radio calling signal. Each pager receiver reproduces the indicated message with reference to the selected key code. The substation comprises a push-button telephone set to send each message to the base station. Preferably, an audio response unit (46) is included in the base station to send the request by the use of an audio signal. It is also preferred that the radio calling signal should comprise call number signals of a low bit rate for calling selected ones of the pager receiver with the message information transmitted in the radio calling signal either at a high bit rate or at a plurality of high bit rates.

18 Claims, 16 Drawing Figures

| | MODE | | TIME | | ACTIVITIES |
|---|---|---|---|---|---|
| 0 | SKIP | 0 | SKIP | 0 | SKIP |
| 1 | NAME | 1 | " "O'CLOCK" "MINUTE" | 1 | PHONE |
| 2 | PHONE NUMBER | 2 | IMMEDIATELY | 2 | GO |
| 3 | PLACE | 3 | TOMORROW | 3 | WAIT |
| 4 | (NAME) + (PHONE NUMBER) | 4 | MORNING | 4 | COME BACK |
| 5 | (NAME) + (PLACE) | 5 | AFTERNOON | 5 | — |
| 6 | (NAME) + (PLACE) + (PHONE NUMBER) | 6 | — | 6 | — |

| 1 | 2 | 3 |
|---|---|---|
| 4 | 5 | 6 |
| 7 | 8 | 9 |
| * | 0 | # |

| TEN KEY \ *KEY | | * | * * |
|---|---|---|---|
| 1 | A | K | U |
| 2 | B | L | V |
| 3 | C | M | W |
| 4 | D | N | X |
| 5 | E | O | Y |
| 6 | F | P | Z |
| 7 | G | Q | — |
| 8 | H | R | . |
| 9 | I | S | , |
| 0 | J | T | ! |

FIG. 5

| STEP | SUBSCRIBER | BASE STATION |
|---|---|---|
| S1 | OFF-HOOK | |
| S2 | PRODUCTION OF "035251045" | (CHECKING CALL NUMBER SIGNAL) REQUESTING AN INPUT OF KEY CODE (1st REQUEST SIGNAL) |
| S3 | PRODUCTION OF "611" | (WAITING FOR THREE DIGITS OF KEY CODE) SENDING BACK THE KEY CODE IN AN AUDIO |
| S4 | INPUTTING "#" | (WAITING FOR SUPPLY OF "#" OR "*#") REQUESTING INPUT OF "NAME" |
| S5 | INPUTTING "SEKIMOTO" | (WAITING FOR INPUT OF "#") SENDING BACK "SEKIMOTO" IN AN AUDIO |
| S6 | INPUTTING "#" | (WAITING FOR "*#" OR "#") REQUESTING INPUT OF "PLACE" |
| S7 | INPUTTING "NEC" | (WAITING FOR "#") AUDIBLY RESTATING "NEC" |
| S8 | INPUTTING "#" | (WAITING FOR "*#" OR "#") REQUEST TIME INFORMATION |
| S9 | INPUTTING "1310" | (WAITING FOR "#") AUDIBLY RESTATING "1310" |
| S10 | INPUTTING "#" | (WAITING FOR "*#" OR "#") REQUESTING INPUT OF "PHONE NUMBER" |
| S11 | INPUTTING "03454111200I" | (WAITING FOR "#") RESTATING THE PHONE NUMBER |
| S12 | INPUTTING "#" | (WAITING FOR "*#" OR "#") AUDIBLY INDICATING COMLETION OF RECEPTION |
| S13 | ON-HOOK | |

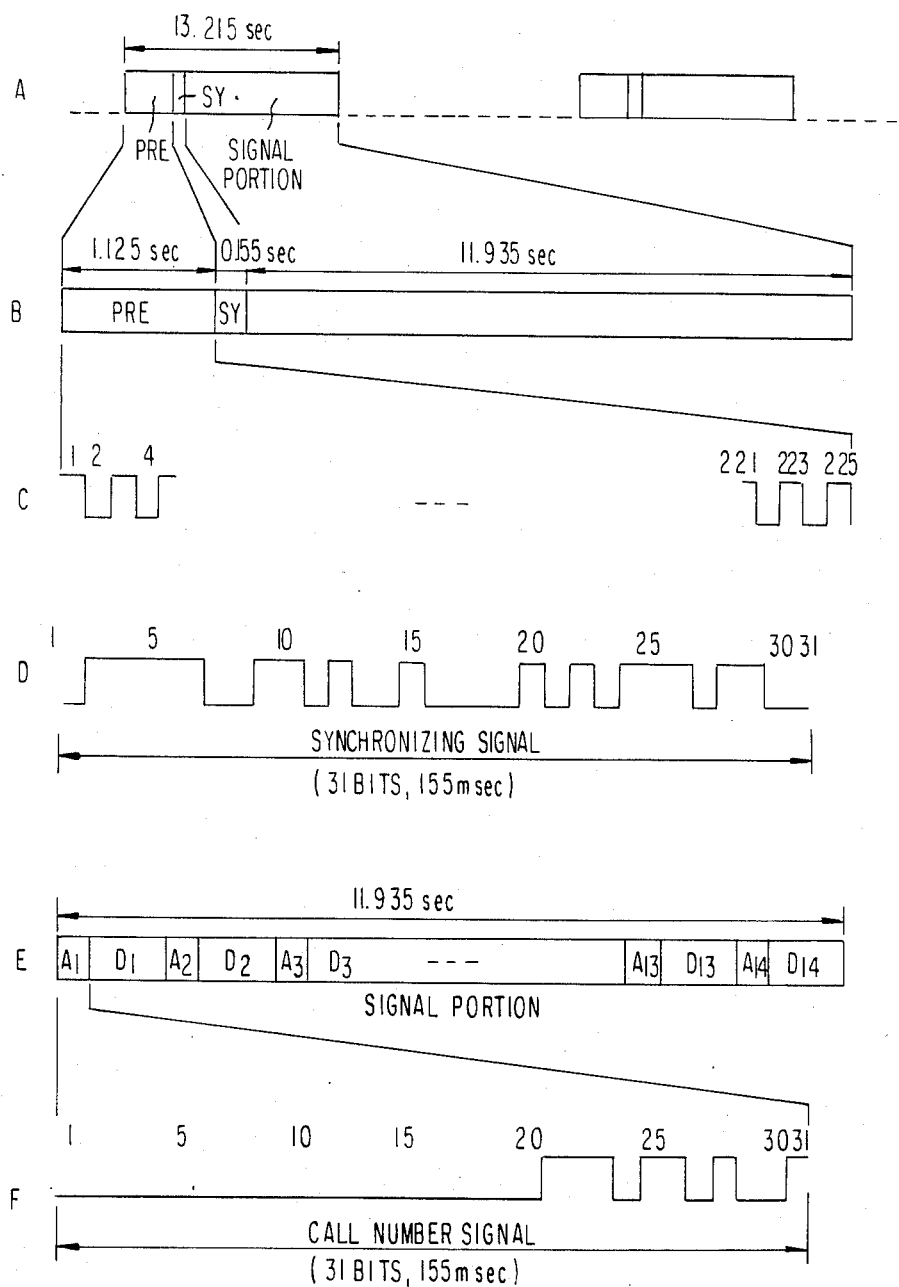

RADIO PAGING METHOD OF ARRANGING MESSAGE INFORMATION WITH REFERENCE TO A KEY CODE AND A BASE STATION AND A PAGER RECEIVER FOR USE IN THE METHOD

BACKGROUND OF THE INVENTION

This invention relates to a radio paging method and to a base station and a pager receiver both of which are available to the radio paging method.

In general, a radio paging method of the type described is for use in a radio paging system comprising a plurality of subscriber substations, a base station connected through wires to the subscriber substations, and a plurality of pager receivers selected through radio channels by the base station. Unidirectional communication is carried out by such a radio paging method from each of the subscriber substations to the pager receivers through the base station to selectively call up one of the pager receivers. In addition to transmission of a call number signal, message information can also be transmitted from the base station to the pager receivers. Development of semiconductor integration techniques has enabled transmission of such message information to the pager receivers because each of the pager receivers is thereby enabled to carry out complicated processing to receive the message information. In such unidirectional communication, it is preferred to raise a calling rate in each radio channel and to accommodate as many pager receivers as possible in the radio paging system.

A conventional radio paging method is used to transmit, as the message information, only numerals specified by a maximum of ten digits. Each numeral is transmitted following the call number signal. However, a recent requirement is that various kinds of message be sent to the pager receivers as the message information in addition to the numerals. The conventional radio paging method can not satisfy the recent requirement.

Another conventional method can transmit, as the message information, a long message composed of a maximum of 960 characters. This method is disadvantageous in that the calling rate is inevitably reduced in each radio channel because each radio channel is occupied for a long time. Moreover, each subscriber's substation should be provided with an expensive and non-portable input device to produce such a long message. Stated otherwise, the message information can not be always produced everywhere and every time as long as such an input device is not prepared at the subscriber's substation.

It will readily be understood from the above that an increase in the transmission rate would be desirable because a higher performance is thereby given to the radio paging system. However, reception sensitivity is degraded at each pager receiver when the transmission rate increases greatly. Thus, it is desirable that the reception sensitivity is rendered high at each pager receiver and a wide variety of message information can be transmitted from the base station.

SUMMARY OF THE INVENTION

It is an object of this invention to provide a radio paging method which is capable of rapidly and simply transmitting a wide variety of message information without the need for a special input device.

It is another object of this invention to provide a radio paging method of the type described, which is capable of raising the calling rate in each radio channel.

It is another object of this invention to provide a radio paging method of the type described, wherein the reduction of reception sensitivity at each pager receiver can be minimized despite the increase of the transmission rate.

It is a further object of this invention to provide a base station for use in a radio paging method of the type described, which can rapidly transmit a wide variety of message information.

It is a further object of this invention to provide a pager receiver for use in a radio paging method of the type described, which can accurately receive various message information.

A radio paging method to which this invention is applicable is for use in transmitting radio calling signals from a base station to pager receivers. The radio calling signals include message information specified by a plurality of species. According to this invention, the radio paging method comprises the steps of providing a plurality of key codes for the respective species, receiving at the base station from a subscriber's substation a call number signal assigned to one of the pager receivers that is selected at the subscriber's substation, requesting, in response to the received call number signal, the subscriber's substation from the base station to select one of the key codes, requesting, in compliance with the selected one of the key codes, receiving the selected key code at the base station the subscriber's substation to convey the message information to be transmitted from the base station to the selected one of the pager receivers, receiving the conveyed message information at the base station, and transmitting from the base station, as one of the radio calling signals, to the pager receivers the call number signal and a message signal carrying the received key code and the received message information.

BRIEF DESCRIPTION OF THE DRAWING

FIG. 5 shows a flow chart for describing operation of the base station illustrated in FIG. 1;

FIGS. 7(a) and 7(b) show a time chart for describing a call number signal and a message signal both of which are conveyed from the base station illustrated in FIG. 1;

DESCRIPTION OF THE PREFERRED EMBODIMENTS

Figure 1:
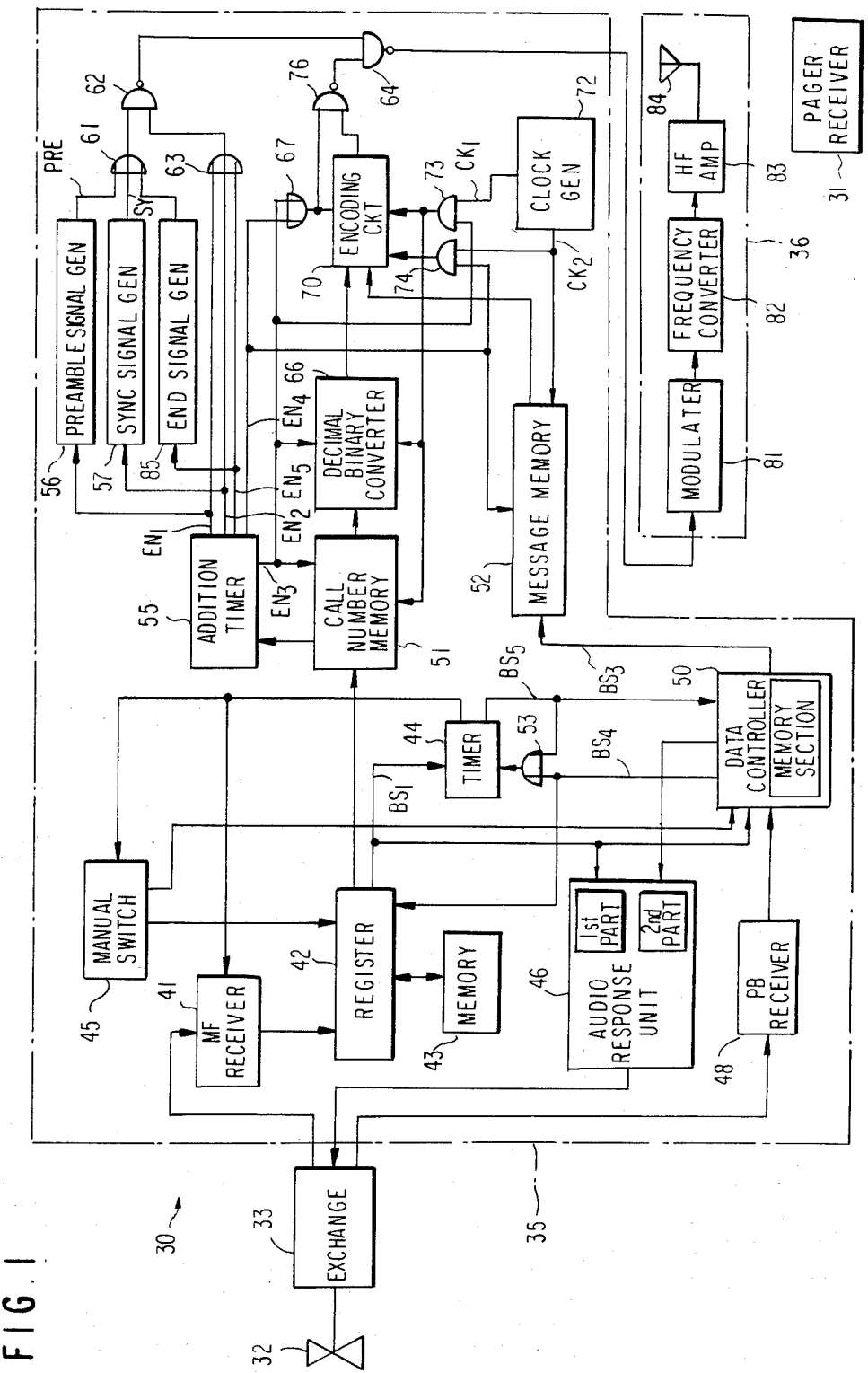
FIG. 1 shows a block diagram of a base station according to a preferred embodiment of this invention together with a subscriber's substation and a single pager receiver.

Referring to FIG. 1, a base station 30 according to a preferred embodiment of this invention is for use in a radio paging system in transmitting radio calling signals to pager receivers of the radio paging system. Only one of the pager receivers is indicated at 31 in FIG. 1. The base station 30 is connected to subscriber substations which are represented by a single subscriber's substation 32 and which are used by subscribers. The subscriber's substation 32 produces a call number signal and message information. The call number signal which is assigned to one of the pager receivers serves to select that one pager receiver.

It is preferable that information necessary and sufficient to the radio paging system can be conveyed to the pager receivers as the message information. As a result of classification of the information, it has been found out that the information can be divided into five information classes composed to "TIME," "PLACE," "NAME," "ORDERS," and "PHONE NUMBER" and that all classes are not always included in the information. This means that the information is specified by that combination of the information class or classes which is herein called a species.

If a species is specified or proclaimed by each subscriber prior to production of the message information, and the base station 30 determines, in compliance with the specified species, a format of each message signal to be transmitted, the base station 30 is capable of rapidly and readily processing the information sent from each subscriber's substation. In addition, a redundency of each message signal is thereby remarkably reduced as will become clear as the description proceeds.

For this purpose, a plurality of key codes are assigned to the respective species to define each species.

Figures 2, 3, 4, 6:
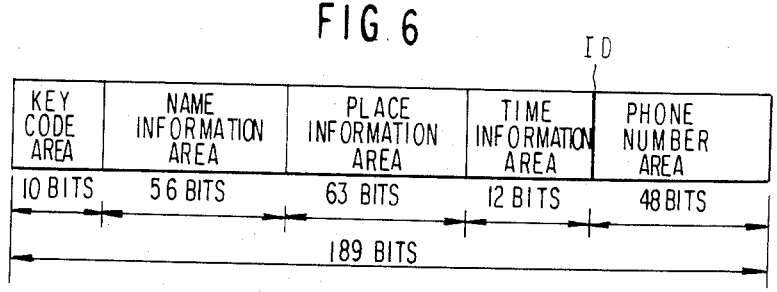
FIG. 2 shows a view for describing key codes for use in FIG. 1.
FIG. 3 shows a view for describing a push-button telephone set for use in the subscriber's substation illustrated in FIG. 1.
FIG. 4 shows a view for describing correspondence between characters and keys illustrated in FIG. 3.
FIG. 6 shows a view for describing a memory area which is included in the base station illustrated in FIG. 1 and which is for use in storing message information transmitted from the subscriber's substation.

Temporarily referring to FIG. 2, each of the key codes has three digits or figures when represented by the decimal notation. The most significant digit shown in the leftmost or first column can take one of the numbers between zero and six and specifies combinations of three information classes composed of "NAME," "PLACE," and "PHONE NUMBER," as illustrated in the second column labelled "MODES" in FIG. 2. Such combinations will be called modes. When any combination is not included in the message information transmitted from the subscriber's substation 32 and is consequently neglected or subjected to "SKIP," the mode "0" is indicated to represent absence of the combinations.

In FIG. 2, the third column represents the numbers to be placed as the second digit of each key code while the fourth column represents information relating to "TIME" specified by each number. The number "0" is used as the second digit when the information is unnecessary as regards time and should be subjected to "SKIP."

Likewise, the fifth column represents the numbers to be put at the least significant or the third digit of each key code while the sixth column represents information relating to "ACTIVITY," namely, directions or commands specified by each number. In the example being illustrated, four of the activities can be transmitted.

It should be noted here that definite contents or messages of the information are given by each subscriber when the first digit of each key code takes the number selected from "1" to "6" and when the second digit takes the number "1."

Herein, the longest one of messages may be produced as the message information when the first and the second digits of a key code take "6" and "1," respectively and followed by the third digit indicative of significant information. For a better understanding of this invention, the key code of "611" is assumed to be indicated by the subscriber at the subscriber's substation 32 to deliver to the pager receiver 31 a specific message of "Phone Sekimoto in NEC [Corporation] at ten minutes past thirteen [o'clock]. Phone Number 03-454-1111 (2001)." Let a specific call number signal assigned to the pager receiver 31 be 03-525-1045.

Referring to FIGS. 3 and 4, the illustrated subscriber's substation 32 comprises a push-button telephone set which has twelve push-button keys as shown in FIG. 3. In addition to a ten-key set indicative of numerals from zero to nine, the keys include a first symbol key for indicating an asterisk "*" which may be called a first symbol and a second symbol key for indicating a number sign "#" which may be called a second symbol. As well known in the art, it is possible for the push-button telephone set to indicate characters by combination of each symbol with each numeral, besides the numerals. Thus, the push-button telephone set is helpful to indicate alphanumeric symbols.

Taking the above into consideration, a table illustrated in FIG. 3 is prepared at the subscriber's substation 32 to convert combinations of the first symbol "*" and each numeral into characters and additional signs. The characters are typically the alphabets. More specifically, the numerals from zero to nine are made to correspond to the characters from "A" to "J," respectively, when the first symbol "*" is not included in the combinations. The respective numerals are made to correspond to the characters from "K" to "T," respectively, when the first symbol key is depressed once for all. The combinations of the first symbol and each numeral are made to correspond to the remaining characters and the signs, respectively, when the first symbol key is twice depressed. On the other hand, the second symbol key is depressed at the end of each character series to indicate an end of each character series. By way of example, a character series "SEKIMOTO" which is one of person names and which is included in the specific message is assumed to be produced from the subscriber's substation 32. In this event, the above-mentioned character series can be specified by a consecutive operation of "*95*19*3*5*0*5."

In addition, the first and the second symbol keys are also depressed on judgement of signals supplied from the base station 30 to the subscriber's substation 32, as will later be described in detail.

Referring back to FIG. 1, the base station 30 comprises an exchange 33 connected to the subscriber substations, an encoder section 35 for carrying out operation in a manner to be described, and a transmitter 36 for broadcasting radio calling signals in cooperation with the encoder section 35.

Operation will be described on the assumption that a call number signal assigned to the pager receiver 31 is produced from the subscriber's substation 32 so as to inform the pager receiver 31 of the specific message exemplified before.

Referring to FIG. 5 together with FIG. 1, the subscriber at the subscriber's substation 32 renders the substation 32 in an off-hook state, as shown at the first step $S_1$ and, thereafter, sends the specific call number signal representative of 03-525-1045 to the base station 30 at the second step $S_2$. The specific call number signal is given through the exchange 33 to the encoder section 35. In the encoder section 35, the specific call number signal is received at a multi-frequency receiver 41 and thereafter sent to a register section 42. As a result, the specific call number signal is kept in the register section 42 in a binary coded decimal form.

The register section 42 is coupled to a memory 43 memorizing a plurality of call number signals assigned to the pager receivers. The register section 42 collates or compares the specific call number signal kept therein with each of the call number signals memorized in the memory 43 to produce a coincidence signal $BS_1$ when coincidence is detected between the former and the latter.

Responsive to the coincidence signal $BS_1$, a timer 44 is energized to time a predetermined time interval of, for example, 10 minutes. The timer 44 supplies the multi-frequency receiver 41 with an inhibition signal $BS_2$ lasting the predetermined time interval. The inhibition signal $BS_2$ is also supplied to a manual switch 45 manually operable by an operator to send a call number signal to the register section 42.

During reception of the inhibition signal $BS_2$, both of the multi-frequency receiver 41 and the manual switch 45 are inhibited from operation. Consequently, the encoder section 35 is exclusively used by the subscriber's substation 32 during presence of the inhibition signal $BS_2$.

An audio response unit 46 which is known in the art comprises a first part responsive to the coincidence signal $BS_1$ for sending a first request signal to the subscriber's substation 32. The first request signal is produced as a first audio signal to request the subscriber's substation 32 to select one of the key codes described in conjunction with FIG. 2.

In order to transmit the specific message mentioned before, the subscriber selects "611" as the selected key code with reference to Table illustrated in FIG. 2 after listening to the first audio signal. This operation is shown at the third step $S_3$ in FIG. 5. The selected key code of "611" is sent through the exchange 33 to a push-button (PB) signal receiver 48 in the form of a push-button signal and thereafter received by a data controller 50 energized in response to the coincidence signal $BS_1$. The selected key code is stored in a memory section included in the data controller 50. After reception of the three digits representative of the specific key code, the data controller 50 delivers the received specific key code to a second part of the audio response unit 46. As a result, the audio response unit 46 sends back a first restatement audio signal to the subscriber's substation 32, as shown at the third step $S_3$. The first restatement audio signal restates the selected key code.

If the first restatement audio signal is incorrect, namely, is not coincident with the selected key code, the subscriber successively depresses the first symbol key and thereafter the second symbol key by the use of the push-button telephone set illustrated in FIG. 3 to produce a first response signal specified by a symbol set "*#" of the first and the second symbols. The first response signal indicates that the selected key code is incorrectly restated by the first restatement audio signal.

On the other hand, if the first restatement audio signal is correct or is coincident with the selected key code, the subscriber depresses only the second symbol key in a similar manner, as shown at the step $S_4$ in FIG. 5, to produce a second response signal specified by the second symbol "#." The second response signal indicates that the selected key code is correctly restated by the first restatement audio signal.

Either the first or the second response signal is sent from the subscriber's substation 32 through the exchange 33 and the push-button receiver 48 to the data controller 50.

When the first response signal is received, the data controller 50 again makes the audio response unit 46 produce the first request signal in the manner shown at the second step $S_2$ in FIG. 5.

On the other hand, when the second response signal is supplied from the subscriber's substation 32, the data controller 50 converts the selected key code of "611" stored in the memory section into a binary signal corresponding to the selected key code. The converted key code is stored in a key-code area of the memory section of the data controller 50. Simultaneously, that mode of the converted key code which corresponds to the first digit of each key code illustrated in FIG. 2 is translated to indicate the order in which the message information should be supplied from the subscriber's substation 32. Thereafter, the data controller 50 makes the audio response unit 46 produce a second request signal indicative of a command or request preassigned to the selected key code. The second request signal requests the subscriber's substation to produce the message information to be transmitted to the selected pager receiver 31.

Inasmuch as the mode "6" is indicated by the selected key code, the data controller 50 judges the specific message as a consecutive combination of "NAME," "PLACE," and "PHONE NUMBER." Therefore, the data controller 50 successively indicates inputs of "NAME," "PLACE," and "PHONE NUMBER" by the use of the second request signal through the audio response unit 46. As a result, the second request signal is successively sent to the subscriber's substation 32 as an audio signal, which may be called a second audio signal.

More particularly, the second request signal at first requests the input of "NAME" to the subscriber's substation 32, as shown at the fourth step $S_4$ in FIG. 5. Responsive to the second request signal, the subscriber inputs "SEKIMOTO" as name information by the use of the push-button telephone set with reference to Table illustrated in FIG. 4 in the manner described before, as shown at the fifth step $S_5$ in FIG. 5. The second symbol "#" follows the name information to indicate completion of the name information.

The name information is successively supplied through the push-button receiver 48 to the data controller 50 to be decoded. The data controller 50 makes the audio response unit 46 produce a second restatement audio signal audibly restating the name information, as shown at the fifth step $S_5$.

After listening to the second restatement audio signal, the subscriber produces either a third or a fourth response signal indicating that the name information is incorrectly and correctly restated by the second restatement audio signal, respectively. The third and the fourth response signals are produced by depressing a symbol set of "*#" and the second symbol "#," as are the cases with the first and the second response signals, respectively.

Either the third or the fourth response signal is sent to the data controller 50 through the exchange 33 and the pushbutton receiver 48.

Responsive to the third response signal, the data controller 50 requests the name information to the subscriber's substation 32 again by repeating the fourth step $S_4$ shown in FIG. 5.

On the other hand, the name information is converted into a transmitting name signal in a known manner in the data controller 50 to be stored in the memory section when the fourth response signal is received by the data controller 50. In the transmitting name signal, each character is represented by seven bits. In this event, the data controller 50 controls the audio response unit 46 in accordance with the key code memorized in the memory section to make the audio response unit 46 audibly produce a request of place information as the second request signal, as shown at the sixth step $S_6$ in FIG. 5.

After reception of the audible request of place information, the subscriber inputs "NEC" as the place information by the use of the push-button telephone set, as shown at the seventh step $S_7$. The place information is followed by the second symbol indicative of completion of the place information, as is the case with the name information.

Responsive to the place information followed by the second symbol "#," the data controller 50 makes the audio response unit 46 audibly produce the place information of "NEC" as the second restatement audio signal. Thus, the place information is restated by the second restatement audio signal at the seventh step $S_7$.

The subscriber sends the third response signal specified by the symbol set "*#" to the data controller 50 through the exchange 33 and the push-button receiver 48 when the second restatement audio signal is not coincident with the place information of "NEC." In this event, the data controller 50 makes the audio response unit 46 send again the request of the place information to the subscriber, as shown at the sixth step $S_6$.

To the contrary, the subscriber sends the fourth response signal specified by "#" to the data controller 50 when the second restatement audio signal is coincident with the place information of "NEC." Supplied with the fourth response signal, the data controller 50 controls the audio response unit 46 in compliance with the key code kept in the memory section to produce a request of time information as the second request signal, as shown at the eighth step $S_8$. Such a request is audibly sent from the audio response unit 46 to the subscriber 32, as are the case with the requests of the name and the place information.

Responsive to the request of time information, the subscriber inputs, as the time information, "1310" by the use of the push-button telephone set, as shown at the ninth step $S_9$. When the time information is followed by the second symbol "#," the data controller 50 makes the audio response unit 46 audibly restate the time information of "1310" as the second request signal.

After listening to the restated time information, the subscriber selectively sends back the third and the fourth response signal to the data controller 50 through the exchange 33 and the push-button receiver 48 when the restated time information is incorrectly and correctly restated by the second restatement audio signal, respectively.

Supplied with the third response signal, the data controller 50 carries out the eighth step $S_8$ again to request the time information to the subscriber's substation 32.

When the fourth response signal representative of the second symbol "#" is sent back from the subscriber, as shown at the tenth step $S_{10}$, the data controller 50 puts the audio response unit 46 into operation again in compliance with the key code stored in the memory section. In this event, the audio response unit 46 audibly sends a request of phone number information as the second request signal to the subscriber's substation 32. Thus, the tenth step $S_{10}$ is followed by the eleventh step $S_{11}$.

At the eleventh step $S_{11}$, the subscriber sends "034541111 2002" as the phone number to the data controller 50 in the above-mentioned manner. The phone number is audibly restated through the data controller 50 and the audio response unit 46 as the second restatement audio signal after the second symbol "#" is received at the date controller 50.

If the restated phone number is incorrectly restated by the second restatement audio signal, the subscriber sends back the third response signal to the data controller 50 to carry out the tenth step $S_{10}$ again. Otherwise, the second symbol "#" is sent back as the fourth response signal from the subscriber to the data controller 50, as shown at the twelfth step $S_{12}$. The data controller 50 makes the audio response unit 46 audibly produce an indication representative of completion of reception of the specific message information. Such an indication is supplied as the second request signal to the subscriber's substation 32.

The subscriber puts the substation 32 in an on-hook state in response to the indication at the thirteenth step $S_{13}$.

Referring to FIG. 6, the memory section of the data controller 50 has a plurality of message areas, each being for 189 bits and assigned to one subscriber. Each message area is divided into a key code area of 10 bits, a name information area of 56 bits, a place information area of 63 bits, a time information area of 12 bits, and a phone number area of 48 bits.

The selected key code of "611" is converted into a binary number code of 10 bits by the data controller 50 to be memorized in the key code area. The key code area of ten bits can enable key codes of 1024-kinds to be memorized at maximum.

The name information of "SEKIMOTO" is processed as character information in the data controller 50 and is converted at each character thereof into a binary character code of seven bits in the known manner. It is readily understood from this fact that eight characters can be stored in the name information area at maximum.

The place information of "NEC" is also processed by the data controller 50 at every character included in the place information to be stored in the place information area, as is the case with the name information. Inasmuch as each character is converted into a binary character code of seven bits, the place information area can be loaded with nine characters at maximum.

The time information of "1310" is converted by the data controller 50 into a binary number code of 12 bits and memorized in the time information area. Thus, the time information area can memorize 4096 sorts of time information.

The phone number signal of "0345411112001" is converted into binary number code of 48 bits and memorized in the phone number area. The number "0" at the most significant decimal digit of the phone number signal can not be expressed as the binary number code, as known in the art. A single identification bit ID is placed in the phone number area to identify or specify the number "0" at the most significant decimal digit. In this event, the identification bit of the logic "1" level can specify transmission of the number "0" while the identification bit of the logic "0" level, no transmission of the number "0." Another method is that the number "0" at the most significant digit is not transmitted from the base station 30 and regenerated by each pager receiver. A phone number signal of fourteen decimal digits can be memorized as the longest phone number signal in the phone number area illustrated in FIG. 6.

As mentioned before, the message information is sent from the subscriber's substation 32 to the data controller 50 in a conversation manner between the subscriber's substation 32 and the data controller 50. The base station 30 audibly sends the first and the second request signals as the first and the second audio signals to the subscriber's substation 32, respectively. In addition, the base station 30 audibly restates the key code and the other message information by the use of the first and the second restatement audio signals. Under these circumstances, the first and the second restatement audio signals may be called a third and a fourth audio signal, respectively.

In FIG. 1, a first combination of the multi-frequency receiver 41, the register section 42, and the first part of the audio response unit 46 serves to send the first request signal to the subscriber's substation 32 while a second combination of the push-button receiver 48, the data controller 50, and the second part of the audio response unit 46 is operable to send the second request signal to the subscriber's substation 32. The first and the second combinations may be named a first and a second circuit, respectively.

When the specific message is completely transferred from the subscriber's substation 32 to the base station 30 before lapse of the predetermined time interval determined by the timer 44, the call number signal kept in the register section 42 is moved to a call number memory 51 for memorizing a preselected number of call number signals as decimal numbers. The preselected number is equal to 14 in this example. Simultaneously, the message information including the key code is transferred from the memory section in the data controller 50 to a message memory 52 as a transferring message signal $BS_3$. In this event, a reset signal $BS_4$ is supplied from the data controller 50 to the timer 44 through an OR gate 53 to reset the timer 44. As a result, the multi-frequency receiver 41 and the manual switch 45 are released from inhibited states.

On the other hand, if the predetermined time interval lapses before the message information is not completely sent from the subscriber's substation 32 to the data controller 50, the timer 44 supplies a deenergizing signal $BS_5$ to the data controller 50 to clear the message information which is partially stored in the memory section of the data controller 50. The deenergizing signal $BS_5$ is also supplied through the OR gate 53 to the timer 44. The timer 44 per se is reset by the deenergizing signal $BS_5$ and the multi-frequency receiver 41 and the manual switch 45 are released from the inhibited states.

Referring to FIG. 7 together with FIG. 1, an additional timer 55 is energized by the call number memory 51 either when the call number memory 51 is filled with the preselected number of call number signals or when the predetermined time interval of 10 minutes lapses from the beginning of a first one of the call number signals. The additional timer 55 at first delivers a first enable pulse $EN_1$ to a preamble signal generating circuit 56 when energized by the call number memory 51. The first enable pulse $EN_1$ defines a preamble signal duration of 1.125 second, as illustrated in FIGS. 7(A) and (B). During the preamble signal duration, the preamble signal generating circuit 56 produces a preamble signal PRE specified by repetitions of the logic "1" and the logic "0" levels, as illustrated in FIG. 7(C). The preamble signal generating circuit 56 comprises a multivibrator and a counter, as known in the art.

Figure 7B:
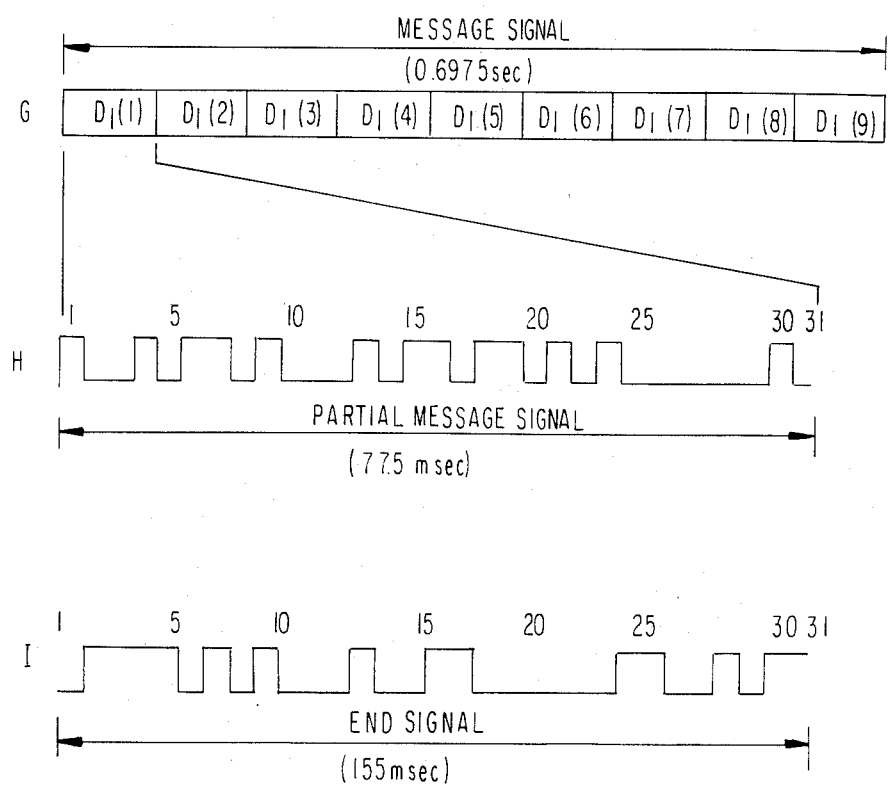

After disappearance of the first enable pulse $EN_1$, the additional timer 55 supplies a synchronizing signal generator 57 with a second enable pulse $EN_2$ lasting 0.155 second, as shown in FIG. 7(B). The synchronizing signal generator 57 comprises a counter having a full count of thirty-one and a read-only memory successively accessed by the counter for producing a synchronizing signal SY having a bit length of 31 bits, as illustrated in FIG. 7(D).

The preamble signal PRE and the synchronizing signal SY are sent to the transmitter 36 through an OR gate 61, a NAND gate 62 enabled through an OR gate 63, and a NAND gate 64.

As illustrated in FIG. 7(A), the synchronizing signal SY is followed by a signal portion lasting 11.935 seconds. The preselected number of call number signals $A_1, A_2, \ldots, A_{14}$ which is equal to 14, is arranged in the signal portion alternatingly with the preselected number of message signals $D_1, D_2, \ldots, D_{14}$ each of which carries message information, as shown in FIG. 7(E). Each call number signal $A_1 \ldots A_{14}$ has a bit length of 31 bits and is produced within 0.155 second, as illustrated in FIG. 7(F). Each message signal $D_1 \ldots D_{14}$ is produced within 0.6975 second and divided into first through ninth partial message signals having a bit length of 31 bits, as exemplified by $D_1(1), D_1(2), \ldots, D_1(9)$ in FIGS. 7(G) and (H). The illustrated call number signals and the illustrated message signals are encoded in a manner to later be described and will therefore be referred to as encoded call number signals and encoded message signals, respectively. For convenience of description, the specific call number signal and the message signal following the specific call number signal are produced as a first one ($A_1$) of the encoded call number signals and a first one ($D_1$) of the encoded message signals, respectively.

The first encoded call number signal $A_1$ should follow the synchronizing signal SY. For this purpose, the additional timer 55 produces a third enable pulse $EN_3$ lasting 0.155 second after lapse of the second enable pulse $EN_2$. The third enable pulse $EN_3$ defines a signal duration for the first encoded call number signal.

The third enable pulse $EN_3$ is delivered from the additional timer 55 to the call number memory 51 and a decimal to binary converter 66 to be described later. In addition, the third enable pulse $EN_3$ is also delivered through an OR gate 67 to an encoding circuit 70.

A clock generator 72 produces a sequence of first clock pulses $CK_1$ at a first clock rate and a sequence of second clock pulses $CK_2$ at a second clock rate higher than the first clock rate. The first and the second clock rates may be, for example, 200 bits/second and 400 bits/second, respectively. Although not shown in detail, such a clock generator 72 may comprise a quartz crystal and a frequency divider. The first clock pulses $CK_1$ are delivered through a first AND gate 73 to the call number memory 51, the decimal to binary converter 66, and the encoding circuit 70 while the second clock pulses $CK_2$ are directly delivered to the message memory 52 and through a second AND gate 74 to the encoding circuit 70. Inasmuch as the first and the second AND gates 73 and 74 are alternatingly enabled in a manner to be described, the first and the second clock pulses $CK_1$ and $CK_2$ are selectively supplied to the encoding circuit 70.

Now, the call number memory 51 is accessed in a prescribed order during presence of the third enable pulse $EN_3$. The stored and specific call number signal is read as the decimal number out of the call number memory 51 in synchronism with the first clock pulses and is sent to the decimal to binary converter 66 to be converted into a binary number signal. The binary number signal is encoded by the encoding circuit 70 into a BCH code of (31, 21) to be produced as the first encoded call number signal $A_1$, where the first term "31" in the parentheses represents a code length of the binary number signal and the second term "21," the number of information bits included in the binary number signal. The first encoded call number signal $A_1$ is sent through NAND gates 76 and 64 to the transmitter 36 at the first clock rate determined by the first clock pulses $CK_1$. The encoding circuit 70 may be a combination of a shift register and an adder, as described by Wesley Peterson in "Error-Correcting Codes," pp. 149-152, published in 1961 from The MIT Press.

After lapse of the third enable pulse $EN_3$, the additional timer 55 supplies the second AND gate 74 and the message memory 52 with a fourth enable pulse $EN_4$ lasting during 0.6975 second illustrated in FIG. 7(G). Inasmuch as the message memory 52 is supplied with the second clock pulses $CK_2$, the message information accompanying the specific call number signal is read out of the message memory 52 at the second clock rates and sent to the encoding circuit 70 to be converted into the first encoded message signal $D_1$ of a BCH code (31, 21) at the second clock rate. The first encoded message signal $D_1$ is supplied through the NAND gates 76 and 64 to the transmitter 36 at every one of the first through the ninth partial message signals $D_1(1)$ to $D_1(9)$. Each of the first through the ninth partial message signals $D_1(1)$ to $D_1(9)$ is produced during 77.5 milliseconds.

Thus, the transmitter 36 is successively supplied with the preamble signal PRE, the synchronizing signal SY, and the first encoded call number signal $A_1$, and the first encoded message signal $D_1$. Each signal is subjected to frequency-shift keying, frequency conversion, and amplification at a frequency-shift keying modulator 81, a frequency converter 82, and a high frequency amplifier 83, respectively, to the broadcast as the radio calling signal through an antenna 84. The second one ($A_2$) of the encoded call number signals and the second one ($D_2$) of the encoded message signals follow the first encoded message signal ($A_1$). Likewise, the remaining encoded call number signals are produced together with the corresponding encoded message signal.

Finally, the additional timer 55 supplies an end signal generator 85 with a fifth enable pulse $EN_5$ lasting at least 155 milliseconds, as illustrated in FIG. 7(I). As a result, the end signal generator 85 sends an end signal shown in FIG. 7(I) to the transmitter 36. Such an end signal may be repeatedly produced and arranged after a final one of the encoded message signals.

When the signal portion has a vacant portion having none of the encoded call number signals and the encoded message signals, the end signal may be arranged in the vacant portion.

Thus, an amount of message information is varied in dependency on each key code. It is therefore possible to reduce an average time of the radio paging system occupied by each subscriber.

Each name information may be made to correspond to a number of, for example 5 decimal digits because a comparatively small number of names alone is frequently used by each user. In this case, each pager receiver may comprise a memory for converting each number into the corresponding name.

In FIG. 1, a combination of the generators 56, 57, and 85 and the encoding circuit 70 serves to arrange the stored call number signal, the stored key code, and the stored message information in a predetermined order in cooperation with the clock generator 72 and the first and the second AND gates 73 and 74 to produce an arranged signal. The encoding circuit 70 combines the read out call number signal with the read out message information.

Figure 8:
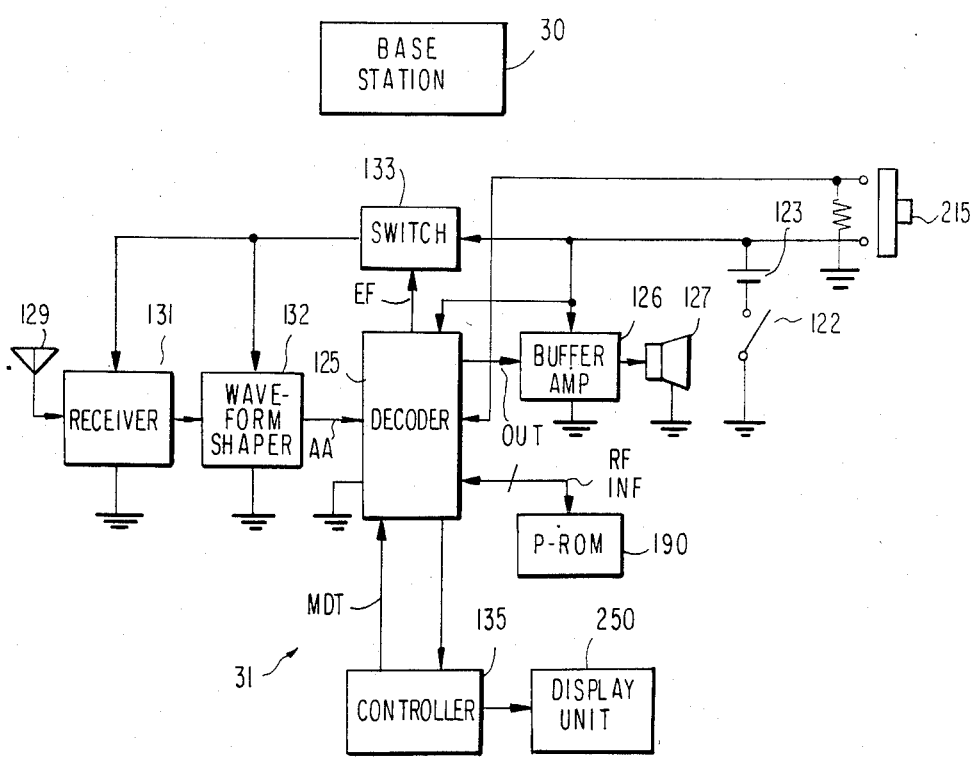
FIG. 8 shows a block diagram of the pager receiver communicable with the base station shown in FIG. 1.

Referring to FIG. 8, the pager receiver 31 is for use in carrying out communication with the base station 30 illustrated in FIG. 1. A considerable number of similar pager receivers are communicable with the base station 30 in its service area. Such pager receivers form a pager system together with the base station 30.

As described in conjunction with FIG. 1, a plurality of subscriber substations are connected to the base station 30. The radio calling signal is transmitted from the base station 30 over the service area.

Figure 9:
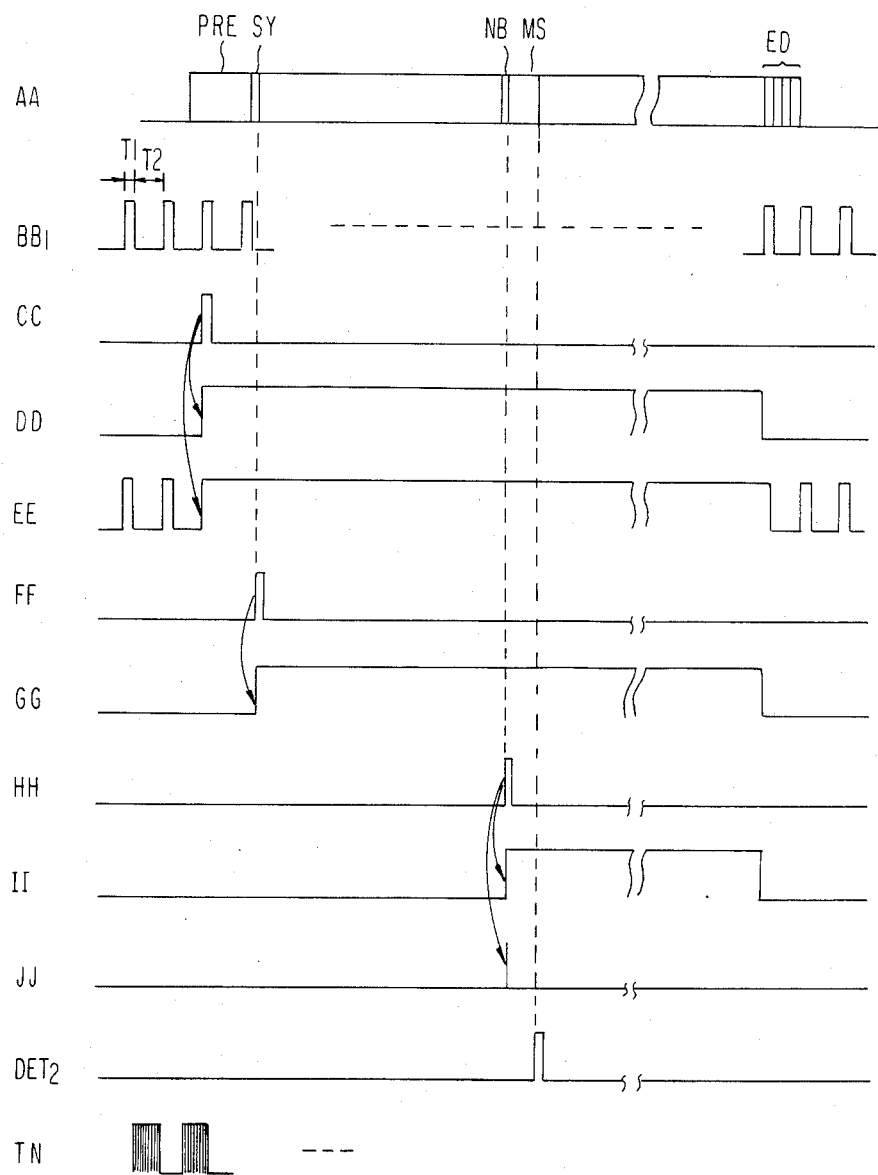
FIG. 9 shows a time chart for describing operation of the pager receiver illustrated in FIG. 8.

Temporarily referring to FIG. 9, the radio calling signal depicted at AA has a frame comprising a preamble signal PRE and a frame synchronizing signal SY. A plurality of call number parts are arranged in the frame to put call number signals, respectively. The first one of the call number parts follows the frame synchronizing signal SY. Each of the call number parts is followed by each of message parts for arranging message signals carrying key codes described in conjunction with FIG. 2. A specific one of the call number signals is depicted at NB while the corresponding one of the message signals is depicted at MS. The number of the message signals is not always equal to that of the call number signals because the call number signals are often accompanied by no message signals. Let the specific call number signal NB and the specific message signal MS be preassigned to the pager receiver 31 illustrated in FIG. 8. The message part is succeeded by a plurality of end signals ED. It is assumed that the BCH code of (31, 21) is used as the frame synchronizing signal, the call number signal, the end signal, and the message signal.

Turning back to FIG. 8, the pager receiver 31 comprises a switch 122 and a battery 123 connected to the switch 122. When closed, the switch 122 puts the pager receiver 31 in an active state. During the active state, an electric voltage is supplied without interruption to a decoder 126 and buffer amplifier 126 connected to the decoder 125. The buffer amplifier 126 drives a loudspeaker 127. The radio calling signal (shown at AA in FIG. 9) is supplied from the base station 30 to the decoder 125 as a reception calling signal through an antenna 129, a receiver 131, and a wave-form shaper 132 in the known manner. Anyway, the reception calling signal has a format similar to that of the radio calling signal AA and will be designated, together with various parts of the reception calling signal, by the same reference symbols as in the radio calling signal AA.

The receiver 131 and the wave-form shaper 132 are connected to the battery 123 through a power saving switch 133 controlled by the decoder 125. The power saving switch 133 is operable to intermittently deliver the electric voltage to both of the receiver 131 and the wave-form shaper 132 while the preamble signal PRE is not received by the pager receiver 31. In other words, the power saving switch 133 is repeatedly put into a conductive and a non-conductive state under control of the decoder 125 during no reception of the preamble signal PRE. Let the conductive and the non-conductive states last 60 milliseconds and 1005 milliseconds, respectively. Thus, the power saving switch 133 serves to reduce power consumption in cooperation with the decoderr 125.

Figure 10:
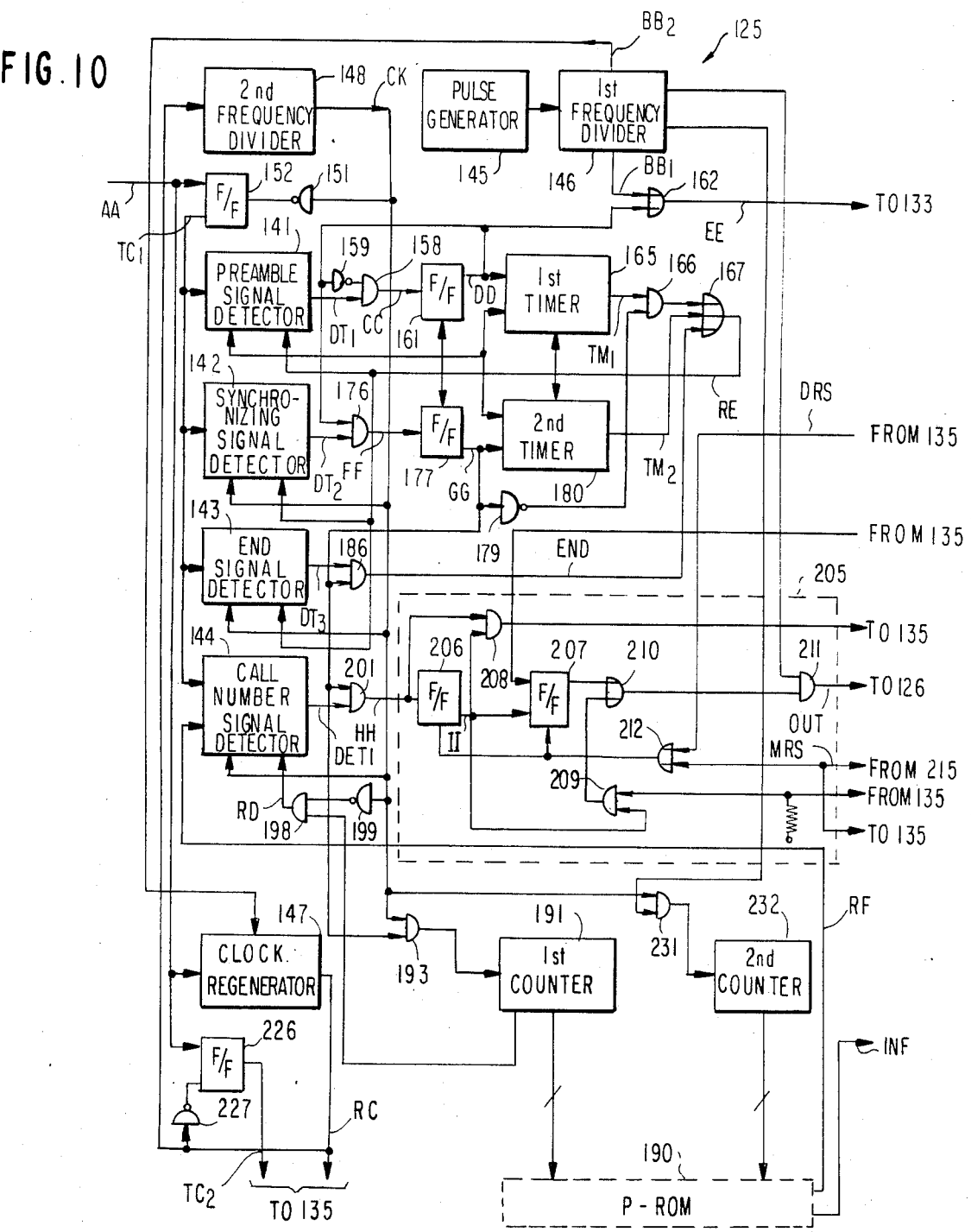
FIG. 10 shows a block diagram of a decoder illustrated in FIG. 8.

Referring to FIG. 10 in addition to FIGS. 8 and 9, the illustrated decoder 125 is operable to detect the preamble signal PRE, the frame synchronizing signal SY, the specific call number signal NB, and the end signal ED except the specific message signal MS while the controller 135 serves to detect the specific message signal MS. Accordingly, the decoder 125 and the controller 135 may be called a first and a second decoder, respectively.

As shown in FIG. 10, the first decoder 125 comprises a preamble signal detector 141, a synchronizing signal detector 142, an end signal detector 143, and a call number signal detector 144 for detecting the preamble signal PRE, the frame synchronizing signal SY, the end signal ED, and the specific call number signal NB, respectively.

In operation, a pulse generator 145 supplies a first frequency divider 146 with a sequence of pulses having a predetermined repetition frequency of, for example, 32 kHz. The first frequency divider 146 produces a sequence of first pulses (shown at $BB_1$ in FIG. 9) in order to render the power saving switch 133 (FIG. 8) into the conductive and the nonconductive states during reception of no preamble signal, as described before. Therefore, each of the first pulses $BB_1$ is present during a first duration $T_1$ of 60 milliseconds and appears at every second duration $T_2$ of 1005 milliseconds. The first frequency divider 146 further produces a sequence of second pulses $BB_2$ at a bit rate of, for example, 400 bits/second. The second pulse sequence $BB_2$ is sent to a clock regenerator 147 which is supplied with the reception calling signal AA from the wave-form shaper 132 (FIG. 8). The clock regenerator 147 is operable to establish bit synchronism and to produce a sequence of regenerated clock pulses RC which has the same bit rate as the second pulse sequence $BB_2$ and which is synchronized with the reception calling signal AA. The regenerated clock pulse sequence RC is delivered to a second frequency divider 148 to produce a sequence of clock pulses CK having a bit rate which is half as high as the bit rate of the regenerated clock pulse sequence RC. As readily understood from the above, the second frequency divider 148 has a factor equal to 2. The clock pulse sequence CK is sent through an inverter 151 to a delay flip flop 152 to which the reception calling signal AA is supplied. In the known manner, the delay flip flop 152 times the reception calling signal AA to the clock pulse sequence CK to produce an output signal $TC_1$. Thus, the delay flip flop 152 serves as a synchronization circuit for the reception calling signal AA. The output signal $TC_1$ may be called a first timed calling signal.

In FIG. 10, the first timed calling signal $TC_1$ is fed to the preamble signal detector 141 responsive to the clock pulse sequence CK and a reset pulse RE given in a manner to be described. The preamble signal detector 141 may comprise a shift register of eight stages for successively storing the timed calling signal $TC_1$ and an AND gate for detecting a pattern of "01010101." The preamble signal detector 141 produces a preamble detection signal $DT_1$ representative of detection of the preamble signal.

It should be noted here that the detection of the preamble signal PRE is carried out during the conductive state of the power saving switch 133. The preamble detection signal $DT_1$ is therefore produced when the preamble signal PRE is partly detected by the preamble signal detector 141.

In FIG. 10, the preamble detection signal $DT_1$ is supplied to an AND gate 158 initially enabled through an inverter 159 and produces a preamble output signal as shown at CC in FIG. 9. Responsive to the preamble output signal CC, a delay flip flop 161 is set to produce a first flip flop output signal depicted at DD in FIG. 9. The first flip flop output signal DD is given to the inverter 159 to disable the AND gate 158 and is sent to an OR gate 162. Supplied with the first pulse sequence $BB_1$, the OR gate 162 delivers a control signal (depicted at EE in FIG. 10) to the power saving switch 133 (FIG. 8). As readily understood from FIG. 10, the control signal EE is determined by the first pulse sequence $BB_1$ before the detection of the preamble signal PRE and by the first flip flop output signal DD after the detection of the preamble signal PRE.

The first flip flop output signal DD is given from the delay flip flop 161 to a first timer 165. The first timer 165 which is previously reset is energized in response to the first flip flop output signal DD and thereafter counts the clock pulse sequence CK so as to time a first predetermined time interval of 1.2 second during which the frame synchronizing signal SY can be detected after detection after detection of the preamble signal PRE. When the first predetermined time interval is timed by the first timer 165, the first timer 165 supplies a first timer signal $TM_1$ through an AND gate 166 to an OR gate 167.

In FIGS. 9 and 10, the synchronizing signal detector 142 is supplied with the first timed calling signal $TC_1$ to detect the frame synchronizing signal SY and to produce a synchronization detection signal $DT_2$ representative of detection of the frame synchronizing signal SY. The frame synchronizing signal SY is composed of 31 bits in the illustrated calling signal. The synchronizing signal detector 142 comprises a shift register having thirty-one stages for succesively storing the first timed calling signal $TC_1$ and an AND gate for detecting a pattern of the frame synchronizing signal SY. At any rate, when the frame synchronizing signal SY is stored in the shift register, the synchronizing signal detector 142 produces the synchronization detection signal $DT_2$ representative of detection of the frame synchronizing signal SY.

In FIG. 10, the synchronization detection signal $DT_2$ is sent to an AND gate 176 which is enabled by the first flip flop output signal DD on detection of the preamble signal PRE. The AND gate 176 supplies a delay flip flop 177 with a synchronization output signal depicted at FF in FIG. 9. Responsive to the synchronization output signal FF, the delay flip flop 177 delivers a second flip flop output signal depicted at GG in FIG. 9 to an inverter 179 to disable the AND gate 166. Accordingly, the first timer signal $TM_1$ is suppressed by the AND gate 166 on detection of the frame synchronizing signal $DT_2$. The second flip flop output signal GG is delivered from the delay flip flop 177 to a second timer 180.

The second timer 180 times a second predetermined time interval to produce a second timer signal $TM_2$ after lapse of the second predetermined time interval. The second timer signal $TM_2$ is supplied to the OR gate 167. The second predetermined time interval is equal to a time interval necessary and sufficient to detect the specific call number signal NB. The second predetermined time interval is assumed to be 12 seconds in the illustrated timer 180.

It is mentioned here that the second timer 180 is energized only when the frame synchronizing signal SY is detected by the synchronizing signal detector 142 before lapse of the first predetermined time interval timed by the first timer 165.

The end signal detector 143 is for detecting the end signals ED each of which is specified by a predetermined pattern of 31 bits. The end signal detector 143 produces an end detection signal $DT_3$ on detection of any one of the end signals ED. The end signal detector 143 may comprise a shift register having thirty-one stages for successively storing the first timed calling signal $TC_1$ in synchronism with the clock pulse sequence CK and an AND gate for detecting a pattern of each end signal ED. Anyway, the end signal detector 143 produces the end detection signal $DT_3$ on reception of the end signal ED.

In FIG. 10, the end detection signal $DT_3$ is supplied to an AND gate 186 connected to the delay flip flop 177. When the AND gate 186 is enabled by the second flip flop output signal GG, the end detection signal $DT_3$ is sent as an end output signal END through the AND gate 186 to the OR gate 167.

When supplied with any one of the first timer signal $TM_1$, the second timer signal $TM_2$, and the end output signal END, the OR gate 167 delivers the reset signal RE to the detectors 141, 142, and 143, the delay flip flops 161 and 177, and the first and the second timers 165 and 180 to put them into reset states.

It should be recalled here that the first timer signal $TM_1$ is suppressed when the second flip flop output signal GG is produced by the delay flip flop 177 as a result of detection of the frame synchronizing signal SY. No reset signal is therefore produced when the frame synchronizing signal SY is detected by the synchronizing signal detector 142 within the first predetermined time interval determined by the first timer 165. Stated otherwise, the reset signal RE appears on no reception of the frame synchronizing signal SY.

If no reset signal appears within the first predetermined time interval, the second predetermined time interval is monitored by the second timer 180 in a manner to be described below. When the end detection signal $DT_3$ is produced from the end signal detector 143 within the second predetermined time interval, the reset signal RE is delivered to the above-mentioned elements. Otherwise, production of the reset signal RE is delayed until the second timer signal $TM_2$ is supplied from the second timer 180 to the OR gate 167. In this event, the reset signal RE appears after lapse of the second predetermined time interval.

At any rate, the first flip flop output signal DD takes the logic "0" level when the reset signal RE is produced from the OR gate 167. As a result, the OR gate 162 sends to the power saving switch 133 (FIG. 8) the first pulse sequence $BB_1$ as the control signal EE. In other words, the first flip flop output signal DD is continuously supplied as the control signal EE to the power saving switch 133, regardless of the first pulse sequence $BB_1$, as long as the reset signal RE is not produced from the OR gate 167. This means that the receiver 131 and the wave-form shaper 132 are continuously energized by the power saving switch 133 while the first flip flop output signal DD takes the logic "1" level.

Figure 11:
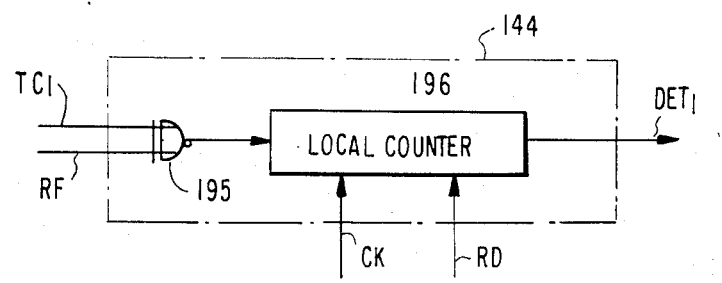
FIG. 11, shows a block diagram of a call number signal detector illustrated in FIG. 10.

Referring to FIG. 11 together with FIG. 10, the call number signal detector 144 is operable to detect the specific call number signal NB reassigned to the pager receiver 31 in question. For this purpose, the call number signal detector 144 cooperates in a manner to be described with a programmable read-only memory (P-ROM) 190 (FIG. 8) storing the specific call number signal. In the example being illustrated, each call number signal is of 31 bits. In addition to the specific call number signal, the programmable read-only memory 190 stores various information signals INF which are indicative of information relating to presence or absence of automatically resetting function, format information relating to a format of the reception calling signal AA, and the like.

A first counter 191 (FIG. 10) is coupled to the programmable read-only memory 190 to read the specific call number signal out of the predetermined address bit by bit. More particularly, the first counter 191 is energized through an AND gate 193 to count the clock pulses CK to thirty-one while the AND gate 193 is enabled by the second flip flop output signal GG. The specific call number signal is read out of the predetermined address simultaneously with energization of the first counter 191 to be kept in a register (not shown) included in the programmable read-only memory 190 and is successively derived from the register in response to each count of the first counter 191. Thus, each bit of the specific call number signal is successively transferred as a reference signal RF of thirty-one bits from the programmable read-only memory 190 to the call number signal detector 144 in synchronism with the clock pulse sequence CK.

In FIG. 11, the call number signal detector 144 comprises an Exclusive NOR gate 195 responsive to the first timed calling signal $TC_1$ and the reference signal RF for producing a logic "1" level signal each time when one bit of the first time calling signal $TC_1$ is coincident with the corresponding bit of the reference signal RF. Each logic "1" level signal is counted by a local counter 196 in synchronism with the clock pulse sequence CK. Similar operation is continuously carried out in the local counter 196 until a thirty-first bit of the reference signal RF appears in timed relation to a thirty-first one of the clock pulses CK. The first counter 191 supplies the logic "1" level to an AND gate 198 in response to the thirty-first clock pulse. After disappearance of the thirty-first clock pulse, the first counter 191 keeps the logic "1" level and the AND gate 198 is enabled in response to the disappearance of thirty-first clock pulse through an inverter 199 to deliver the logic "1" level to the call number signal detector 144 as a read-out request signal RD.

Responsive to the read-out request signal RD, the local counter 196 produces the logic "1" level signal and the logic "0" level signal when the count reaches thirty-one and does not, respectively. The logic "1" level signal is given to an AND gate 201 (FIG. 10) as a call number detection signal or a first detection signal $DET_1$ representative of detection of the specific call number signal. The AND gate 201 produces the first detection signal $DET_1$ as a call number output signal depicted at HH in FIG. 9 when enabled by the second flip flop output signal GG.

The call number output signal HH is processed to produce an output signal OUT in a manner to presently be described. For this purpose, a circuit portion 205 (FIG. 10) is put into operation in relation to the loudspeaker 127 (FIG. 8) through the buffer amplifier 126 and to the controller 135 (FIG. 8). Briefly stated, the output signal OUT is supplied to the loudspeaker 127 after the message signal is detected by the controller 135. Thus, the output signal OUT appears a predetermined interval of time after the call number signal detector 144 is supplied with the call number signal NB.

More particularly, the circuit portion 205 comprises a first delay flip flop 206 responsive to the call number output signal HH, a second delay flip flop 207 connected to the first delay flip flop 206, and a first AND gate 208 connected to the AND gate 201 and the first delay flip flop 206. The circuit portion 205 further comprises a second AND gate 209 connected to the first delay flip flop 206, a first OR gate 210 connected to the second AND gate 209 and the second delay flip flop 207, and a third AND gate 211 connected to the first OR gate 210 and the first frequency divider 146. In addition, a second OR gate 212 is connected to the controller 135 (FIG. 8) and a reset switch 215 (FIG. 8) for use in resetting the first and the second delay flip flops 206 and 207.

Furthermore, the second delay flip flop 207 is supplied from the controller 135 with a message detection signal $DET_2$ representative of detection of the specific message signal. The message detection signal may be called a second detection signal. The second AND gate 209 is supplied with the logic "0" level representative of connection of the controller 135. The second OR gate 212 is connected to the first and the second delay flip flops 206 and 207 and is supplied with a decoder reset signal DRS from the controller 135. In addition, the first AND gate 208 is also connected to the controller 135.

Let the specific call number signal be detected by the call number signal detector 144. In this event, the first detection signal $DET_1$ is produced as the call number output signal HH. The first delay flip flop 206 is set in response to the third output signal HH to deliver the third flip flop output signal II to the second AND gate 209 and the second delay flip flop 207. In this event, the first AND gate 208 supplies the controller 135 with an energizing signal (depicted at JJ in FIG. 9). Inasmuch as the logic "0" level is given to the second AND gate 209, the second AND gate 209 is left disabled. On the other hand, the message or the second detection signal $DET_2$ is supplied from the controller 135 to the second delay flip flop 207 after detection of the specific call number signal. Responsive to the message detection signal $DET_2$, the second delay flip flop 207 is turned into a set state because the third flip flop output signal II takes the logic "1" level. Under the circumstances, the logic "1" level is sent from the second delay flip flop 207 to the third AND gate 211 through the first OR gate 210 in synchronism with the message detection signal $DET_2$.

Thus, the output signal OUT is supplied as a call indication signal or the alert signal from the third AND gate 211 to the loudspeaker 127 to produce a call tone or an alert tone.

When the message signal MS is not correctly received by the controller 135, the decoder reset signal DRS is supplied from the controller 135 to the first and the second delay flip flops 206 and 207 through the second OR gate 212. The first and the second delay flip flops 206 and 207 are reset in response to the decoder reset signal DRS to stop production of the output signal OUT. Therefore, no call tone is produced from the loudspeaker 127 when the message signal is erroneously received.

Figure 12:
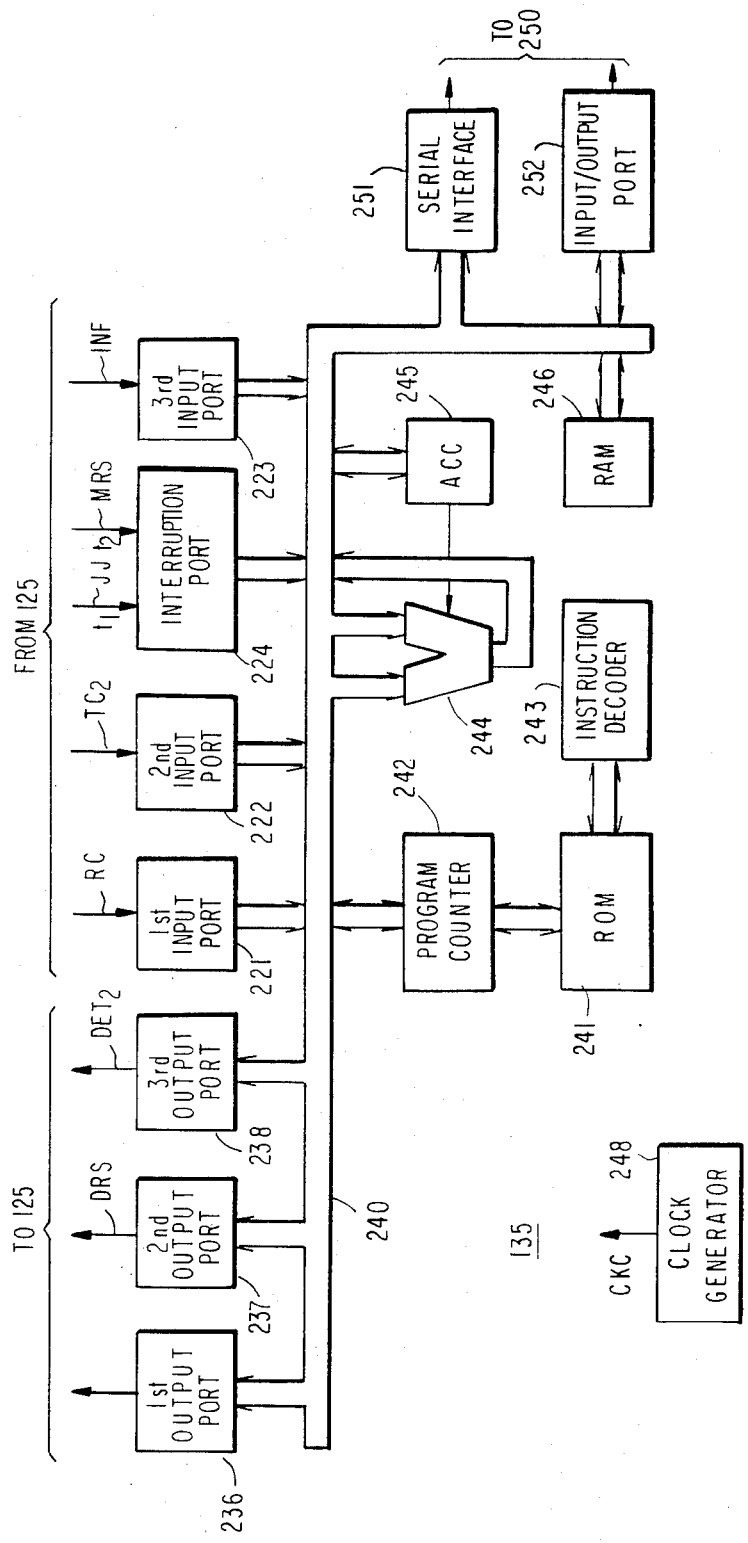
FIG. 12 shows a block diagram of a controller illustrated in FIG. 8.

Referring to FIG. 12 anew and FIG. 8 again, the controller 135 is for use in reproducing the message signal MS which carries the specific message information and the key code in cooperation with the decoder 125. The controller comprises first, second, and third input ports 221, 222, and 223 and an interruption port 224, all of which are connected to the decoder 125.

The first input port 221 is supplied with the regenerated clock pulses RC from the clock regenerator 147 (FIG. 10). It is to be noted here that the regenerated clock pulses RC are produced at the bit rate of 400 bits/second as mentioned before, and never pass through a frequency divider, such as the second frequency divider 148.

Temporarily referring back to FIG. 10, the reception calling signal AA is given to a delay flip flop 226 supplied with the regenerated clock pulses RC through an inverter 227. Consequently, the delay flip flop 226 produces a second timed calling signal $TC_2$ in synchronism with the regenerated clock pulses RC. Thus, the second timed calling signal $TC_2$ is produced at a bit rate equal to twice the bit rate of the first timed calling signal $TC_1$. This means that the message signal MS is processed in the controller 135 at the bit rate determined by the regenerated clock pulses RC.

Turning back to FIG. 12, the second timed calling signal $TC_2$ is given to the second input port 222. The interruption port 224 has a first terminal $t_1$ supplied with the energizing signal JJ on detection of the specific call number signal and a second terminal $t_2$ supplied with a manual reset signal MRS given from the reset switch 215 (FIG. 8) through the decoder 125.

The third input port 223 is supplied through the decoder 125 with each of the information signals INF stored in the programmable read-only memory 190. In FIG. 10, each information signal INF can be read out of the programmable read-only memory 190 by the use of an AND gate 231 and a second counter 232. More specifically, the AND gate 231 is coupled to the first frequency divider 146 to be enabled at a prescribed interval of time and to allow the clock pulses CK to pass therethrough. The second counter 232 counts the clock pulses CK at the prescribed interval to a full count of three to supply each count as an address signal to the programmable read-only memory 190. Thus, the illustrated second counter 232 can indicate eight kinds of the information signals INF.

In FIG. 12, the controller 135 comprises a first output port 236 for sending the logic "0" level to the second AND gate 209 (FIG. 10), a second output port 237 for delivering the decoder reset signal DRS to the first and the second delay flip flops 206 and 207 through the second OR gate 212, and a third output port 238 for supplying the message detection signal $DET_2$ to the second delay flip flop 207.

The first through the third input ports 221 to 223 are coupled to a data bus 240 together with the interruption port 224 and the first through the third output ports 236 to 238.

The controller 135 further comprises a read-only memory 241 having a plurality of addresses and storing a sequence of instructions to be executed in the controller 135. The instruction sequence includes a partial sequence of first instructions for detecting each key code and a partial sequence of second instructions executed after the first instructions for arranging each message information. In addition, a partial sequence of third instructions is included in the instruction sequence to add supplemental information to message information carried from the base station 30. Such supplemental information may be prepositions and the like determined in relation to each key code and is stored in the read-only memory 241. For example, the supplemental information is representative of "in" and "at" of the specific message described in conjunction with FIG. 5. It is to be noted that such supplemental information is not conveyed from the base station 30. A program counter 242 is coupled to the data bus 240 and the read-only memory 241 for indicating each address. An instruction decoder 243 decodes each instruction read out of the read-only memory 241 to deliver a sequence of control signals (not shown) to various elements included in the controller 135. An arithmetic logic unit 244 is coupled to the data bus 240 together with an accumulator 245 and a random access memory 246. The arithmetic logic unit 244 carries out calculation under control of the control signals to store a result of calculation in the random access memory 246. The accumulator 245 is used to transmit data between the random access memory 246 and each of the ports 221 to 224 and 236 to 238. A combination of the instruction decoder 243, the arithmetic logic unit 244, and the accumulator 245 may be called a central processor. The controller 135 further comprises a clock generator 248 for producing a system clock which determines an instruction cycle time and a sequence of clock pulses which is used to put the controller 135 into operation. All of the above-mentioned elements are operable in a well known manner. Description will not be made about the individual elements any longer.

The controller 135 is energized in response to the energizing signal JJ (FIG. 9) which is supplied from the decoder 125 to the interruption port 224 when the specific call number signal is detected by the call number signal detector 144. Thereafter, the second timed calling signal $TC_2$ is supplied from the delay flip flop 226 to the second input port 222 in synchronism with the regenerated clock pulses RC received by the first input port 221. In this event, it is presumed that the second timed calling signal $TC_2$ includes the specific message signal MS carrying the selected key code of "611" and the specific message. Each group of thirty-one bits of the message signal MS is sent to the arithmetic logic unit 244 to be processed therein under control of each instruction stored in the read-only memory 241. Among the thirty-one bits, twenty-one bits are memorized as information bits in the random access memory 246 because the BCH code of (31, 21) is used in the pager system. The remaining bits serve as check bits, as known in the art. Thus, all of information bits are successively stored in the random access memory 246 after errors are checked in each unit of the thirty-one bits with reference to the check bits in a well known manner.

If each information bits of the group are correctly received, the information bits included in a first or a leading one of the groups are read out of the random access memory 246 and sent through the accumulator 245 to the arithmetic logic unit 244. The arithmetic logic unit 244 detects the selected key code of "611" as a detected key code in accordance with the first instructions. The information bits included in the remaining groups are read out of the random access memory 246 as message information and arranged in an order determined by the detected key code under control of the second instructions. The arranged information bits are sent as arranged message information from the accumulator 245 through the serial interface 251 to the display unit 250 as reproduced message information.

In this event, the read-only memory 241 stores the supplemental information representative of the prepositions, such as "in" and "at" seen in the specific message described in conjunction with FIG. 5. The supplemental information are also read out of the read-only memory 241 in accordance with the third instructions to be added to the message information. Thus, the arranged message information including the supplemental information is supplied as the reproduced message information to the display unit 250. As a result, the display unit 250 can visually display a complete message accompanied by the supplemental information. The message detection signal $DET_2$ is supplied from the third output port 238 to the second delay flip flop 207, if all of the information groups are correctly received. The second delay flip flop 207 is set to make the third AND gate 211 produce the output signal OUT as the call indication signal. Thus, the loudspeaker 127 produces the call tone in response to the call indication signal so as to inform the possessor of reception of the specific message signal MS.

Such a call tone can be stopped by closing the reset switch 215 illustrated in FIG. 8. This is because the manual reset signal MRS is transmitted as the decoder reset signal DRS from the reset switch 215 to the first and the second delay flip flops 206 and 207 through the second terminal $t_2$ of the interruption port 224 (FIG. 12), the second output port 237 (FIG. 12), and the second OR gate 212 (FIG. 10).

Figure 13:
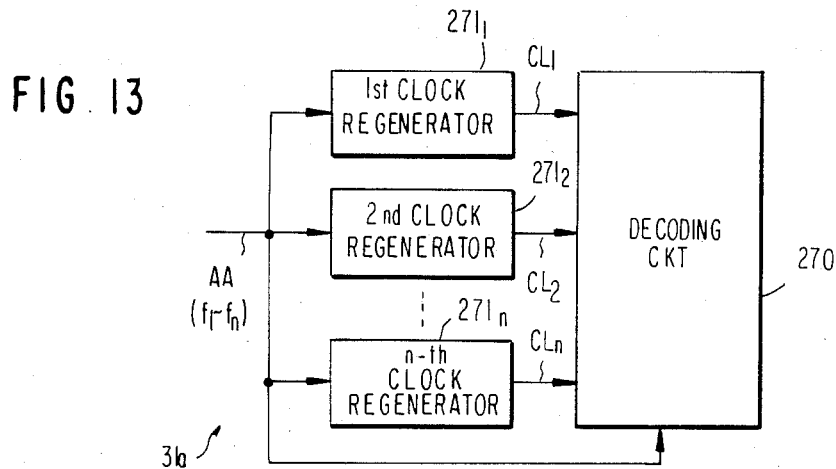
FIG. 13 shows a block diagram of a pager receiver according to another embodiment of this invention.

Referring to FIG. 13, a pager receiver 31a according to another embodiment of this invention is operable in response to a reception calling signal AA comprising a sequence of bit signals having first through n-th transmission rates ($f_1$) to ($f_n$), where n is a natural number greater than one. The bit signal sequence may comprise a specific call number signal sequence at the first transmission rate and a message signal which follows the specific call number signal and which has the remaining transmission rate or rates. Let the transmission rate become higher with an increase of the natural number.

Referring to FIG. 13 more in detail, the pager receiver 31a comprises a decoding circuit which is depicted at 270 and which is operable to detect the specific call number signal and the message signal following the specific call number signal. The decoding circuit 270 is similar to a combination of the decoder 125 and the controller 135 except that the second frequency divider 148 and the clock regenerator 147 are removed from the decoding circuit 270.

The reception calling signal AA is supplied to first through n-th clock regenerators $271_1$ to $271_n$ in parallel to regenerate first through n-th regenerated clock pulses $CL_1$ to $CL_n$ having first through n-th bit rates equal to the first through the n-th transmission rates ($f_1$) to ($f_n$), respectively. The first regenerated clock pulses $CL_1$ are for use in detecting the specific call number signal while the remaining regenerated clock pulses are for use in reproducing the message signal.

Figure 14:
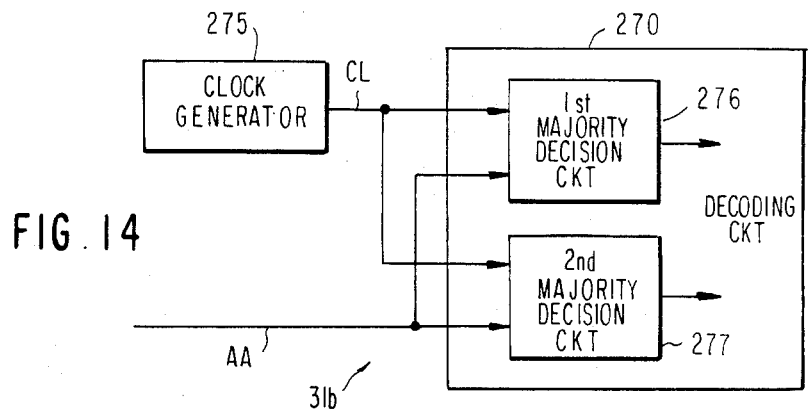
FIG. 14 shows a block diagram of a pager receiver according to a further embodiment of this invention.

Referring to FIG. 14, a pager receiver 31b according to a further embodiment of this invention comprises a decoding circuit 270 which is similar to that illustrated in FIG. 13 and which is responsive to the reception calling signal AA comprising the bit signal sequence which has the first through the n-th transmission rates. Let the n-th transmission rate be the highest one of the transmission rates. For brevity of description, n is assumed to be equal to two hereinunder.

In FIG. 14, a clock generator 275 generates a sequence of clock pulses CL at a predetermined clock rate equal to N-times the highest, namely, the second transmission rate, where N is an integer which is not less than two. The clock pulse sequence CL and the reception calling signal AA are supplied to the decoding circuit 270. The decoding circuit 270 comprises a first majority decision circuit 276 coupled to a decoder similar to that illustrated in FIG. 10. The first majority decision circuit 276 carries out logic operation in accordance with first majority decision to produce a general call number signal including the specific call number signal only when the clock pulses CL are counted to a first predetermined number during presence of each bit of the general call number signal. Thus, the general call number signal is delivered through the first majority decision circuit 276 to the decoder to detect the specific call number signal.

Supplied with the clock pulse sequence CL and the reception calling signal AA, a second majority decision circuit 277 carries out logic operation in accordance with second majority decision to produce the message signal only when the clock pulses CL are counted to a second predetermined number during presence of each bit of the message signal. The message signal is delivered to a controller similar to that illustrated in FIG. 8.

In FIG. 14, it is assumed that N and the first and the second transmission rates are equal to 3 and 100 and 300 bits/second, respectively. In this event, the clock pulse sequence CL is equal to three times the second transmission rate and therefore has a clock rate of 900 bits/second. Furthermore, let the first and the second predetermined numbers be equal to 5 and 2, respectively.

Under these circumstances, the clock pulses CL can be counted to 9 on reception of the general call number signal during each bit thereof. Each bit of the general call number signal is sent through the first majority decision circuit 276 to the decoder when the clock pulses CL are counted to 5 during each bit.

On the other hand, the clock pulses CL can be counted to 3 during each bit of the message signal. Each bit of the message signal is sent through the second majority decision circuit 277 to the controller when the clock pulses CL are counted to 2 during each bit thereof.

Figure 15:
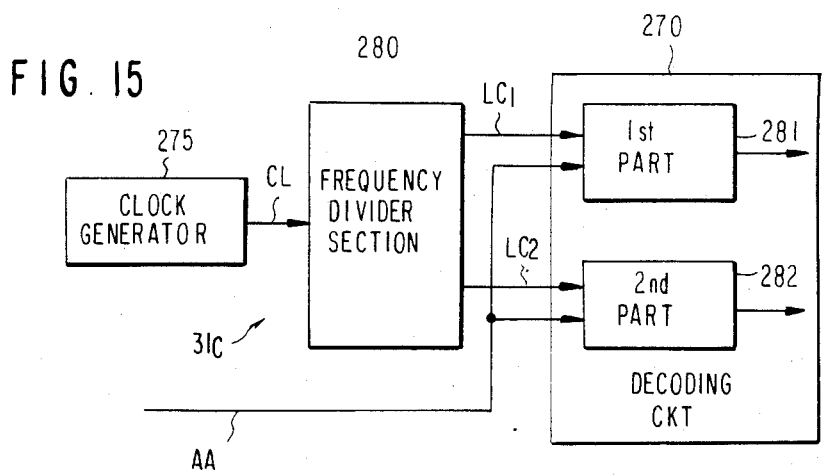
FIG. 15 shows a block diagram of a pager receiver according to another embodiment of this invention.

Referring to FIG. 15, a pager receiver 31c according to another embodiment of this invention comprises similar parts designated by like reference numerals in FIG. 14. The pager receiver 31c further comprises a frequency divider section 280 responsive to the clock pulses CL having the clock rate described before for producing first and second local clock pulses $LC_1$ and $LC_2$ at first and second local clock rates ($f_1'$) and ($f_2'$), respectively. The first and the second local clock rates are equal to an integer multiple of the first and the second transmission rates, respectively.

The decoding circuit 270 comprises a first part 281 responsive to the first local clock pulses $LC_1$ and the reception calling signal AA for carrying out logic operation in accordance with preselected majority decision to receive the general call number signal and to detect the specific call number signal only when the first local clock pulses $LC_1$ are counted to a preselected number. The preselected number is less than the integer.

Responsive to the second local clock pulses and the reception calling signal, a second part 282 carries out logic operation in accordance with the preselected majority decision to receive the message signal only when the second local clock pulses are counted to the preselected number during presence of each bit of the message signal.

It is assumed that the clock pulses CL have a bit rate of 900 bits/second and that the call number signal and the message signal have bit rates of 100 bits/second and 300 bits/second, respectively. Furthermore, it is assumed that the first part 281 is supplied with the first local clock pulses of 300 bits/second while the second part 282 is supplied with the second clock pulses of 900 bits/second. Let the preselected number be two. In this event, the first and the second parts 281 and 282 produces output signals as the general call number signal and the message signal, respectively, when each of the first and the second local clock pulses is counted to two.

In FIGS. 14 and 15, the number of the transmission rates included in the reception calling signal AA may be more than two. In this case, the number of each of the majority decision circuits (FIG. 14) and the parts (FIG. 15) should be increased in correspondence to that of the transmission rates. The clock rate of the clock pulses CL produced at the clock generator 275 should be determined in consideration of the highest one of the transmission rates.

While this invention has thus far been described in conjunction with a few embodiments thereof, it will readily be possible for those skilled in the art to put this invention into practice in various manners. For example, various kinds of codes can be used to transmit the message information from the base station. Each of names may be encoded by the base station into a code of, for example, 5 decimal digits assigned to each name, since a small number of the names are frequently used by the user, as mentioned before. From this purpose, the base station may comprise a memory for converting each name into the corresponding code.

What is claimed is:

1. A radio paging method for use in transmitting radio calling signals from a base station to pager receivers, said radio calling signals including message information originating from at least one subscriber station and specified by a plurality of species, said radio paging method comprising the steps of:

providing a plurality of key codes for the respective species;

receiving at said base station from a subscriber's substation a call number signal assigned to one of said pager receivers that is selected at said subscriber's substation;

requesting from said base station, in response to the received call number signal, said subscriber's substation to select one of said key codes;

receiving the selected key code at said base station;

requesting from said base station, in compliance with the received key code, said subscriber's substation to convey the message information to be transmitted to the selected one of said pager receivers;

receiving the conveyed message information at said base station; and transmitting from said base station, as one of said calling signals, to said pager receivers said call number signal and a message signal carrying the received key code and the received message information.

2. A radio paging method as claimed in claim 1, wherein:

said key code selected requesting step comprises the step of sending a first audio signal from said base station to said subscriber's substation to make said subscriber's substation produce the selected one of said key codes;

said message information requesting step comprising the step of sending a second audio signal from said base station to said subscriber's substation to make said subscriber's substation produce the message information to be transmitted, said second audio signal being indcative of a command preassigned to the selected one of said key codes.

3. A radio paging method as claimed in claim 2, further comprising the steps of:

sending from said base station, in response to the received key code, a third audio signal to said subscriber's substation before said message information requesting step, said third audio signal restating the selected one of said key codes;

sending, in response to said third audio signal, a first or a second response signal from said subscriber's substation to said base station before said message information requesting step, said first and said second response signals indicating that the selected one of said key codes in incorrectly and correctly restated by said third audio signal, respectively;

making said base station repeat said key code selection requesting step whenever said first response signal is received at said base station; and making, in response to the received second response signal, said base station carry out said message information requesting step.

4. A radio paging method as claimed in claim 3, further comprising the steps of:

sending, in response to the received message information, a fourth audio signal from said base station to said subscriber's substation, said fourth audio signal restating the received message information;

sending, in response to said third audio signal, a third or a fourth response signal from said subscriber's substation to said base station before said transmitting step, said third and said fourth response signals indicating that the conveyed message information is incorrectly and correctly restated by said fourth audio signal, respectively;

making said base station repeat said message information requesting step whenever said third response signal is received at said base station; and making, in response to the received fourth response signal, said base station carry out said transmitting step.

5. A base station for use in a radio paging system in transmitting radio calling signals to pager receivers of said radio paging system, said radio calling signals including message information of a plurality of species, said base station comprising:

first means responsive to a call number signal assigned to one of said pager receivers that is selected at a subscriber's substation coupled to said base station, for sending a first request signal to said subscriber's substation, said first request signal requesting said subscriber's substation to select one of a plurality of key codes which are preliminarily assigned to the respective species;

second means responsive to the selected one of said key codes for sending a second request signal to said subscriber's substation, said second request signal requesting said subscriber's substation to produce the message information to be transmitted to the selected one of said pager receivers; and transmitting means responsive to said call number signal, said selected key code and the message information produced at said subscriber's substation for transmitting, as one of said radio calling signals, said call number signal and a message signal carrying said selected key code and the message information produced at said subscriber's substation.

6. A base station as claimed in claim 5, wherein:

said first means is responsive to said call number signal for sending a first audio signal to said subscriber's substation as said first request signal;

said second means comprising subsidiary means responsive to the selected one of said key codes for sending a second audio signal to said subscriber's substation as said second request signal, said second audio signal being indicative of a command preassigned to the selected one of said key codes.

7. A base station as claimed in claim 6, wherein said second means further comprises:

third means responsive to the selected one of said key codes for sending a third audio signal to said subscriber's substation, said third audio signal restating the selected one of said key codes; and first additional means responsive to a first and a second response signal sent back from said subscriber's substation for making said first means and said subsidiary means send said first and said second audio signals to said subscriber's substation, said first and said second response signals indicating that the selected one of said key codes is incorrectly and correctly restated by said third audio signal, respectively.

8. A base station as claimed in claim 7, wherein said second means further comprises:

fourth means responsive to the message information produced at said subscriber's substation for sending a fourth audio signal to said subscriber's substation, said fourth audio signal restating the message information produced at said subscriber's substation; and second additional means responsive to a third and a fourth response signal sent back from said subscriber's substation for making said subsidiary means and said transmitting means send said second request signal and said one of the radio calling signals, respectively, said third and said fourth response signals indicating that the message information produced at said subscriber's substation is incorrectly and correctly restated by said fourth response signal, respectively.

9. A base station as claimed in claim 5, wherein said transmitting means comprises:
storage means for storing said call number signal, said selected key code, and the message information produced at said subscriber's substation;
arranging means coupled to said storage means for arranging the stored call number signal, the stored key code, and the stored message information in a predetermined order to produce an arranged signal; and
transmission means for transmitting said arranged signal as said one of the radio calling signals.

10. A base station as claimed in claim 9, wherein said arranging means comprises:
clock means for selectively producing a sequence of first clock pulses at a first clock rate and a sequence of second clock pulses at a second clock rate higher than said first clock rate;
first reading means responsive to said first clock pulse sequence and coupled to said storage means for reading the stored call number signal out of said storage means at said first clock rate;
second reading means responsive to said second clock pulse sequence and coupled to said storage means for reading the stored key code and the stored message information at said second clock rate; and
combining means for combining the read out call number signal with the read out message information in said predetermined order to produce said arranged signal.

11. A pager receiver responsive to a reception calling signal including a general call number signal for providing an alert signal and a message display when said general call number signal is a specific call number signal assigned to said pager receiver and is followed by a message signal successively carrying a selected one of a plurality of key codes and message information of a selected one of species to which said key codes are assigned, respectively, said pager receiver comprising:
detecting means responsive to said reception calling signal for detecting said specific call number signal to produce a detection signal representative of detection of said specific call number signal;
alerting means responsive to said detection signal for providing said alert signal;
reproducing means energized by said detection signal and responsive to said message signal for reproducing said message information with reference to the key code indicated by said message signal; and
display means for displaying said reproduced message information as said message display.

12. A pager receiver as claimed in claim 11, wherein said reproducing means comprises:
means energized by said detection signal and responsive to said message signal for detecting said key code; and
arrangement means responsive to the detected key code for arranging said message information in an order determined by the detected key code to produce said arranged message information as said reproduced message information.

13. A pager receiver as claimed in claim 12, wherein said arrangement means comprises:
storing means responsive to said detected key code for storing supplemental information determined by said detected key code; and
means responsive to said detected key code and said message information and operatively coupled to said storing means for adding said supplemental information to said message information to produce the arranged message information.

14. A pager receiver as claimed in claim 11, said specific call number signal having a first transmission rate and being followed by said message signal having at least one second transmission rate higher than said first transmission rate, said pager receiver further comprising:
clock delivery means for delivering receiver clock pulses to said detecting means and said reproducing means to establish bit synchronism of said preassigned call number signal and said message signal in said detecting and said reproducing means, respectively.

15. A pager receiver as claimed in claim 14, wherein said clock delivery means comprises:
clock pulse producing means for producing, as said receiver clock pulses, first and second clock pulses at first and second clock rates equal to said first and said second transmission rates, respectively;
first supply means for supplying said detecting means with said first clock pulses; and
second supply means for supplying said reproducing means with said second clock pulses.

16. A pager receiver as claimed in claim 14, said reception calling signal being given as a binary signal having a plurality of bits, wherein said clock delivery means comprises:
clock generating means for producing a sequence of clock pulses at a predetermined clock rate equal to N times the highest one of said at least one second transmission rate where N is an integer which is not less than two; and
supply means for supplying said detecting means and said reproducing means with said clock pulse sequence as said receiver clock pulses.

17. A pager receiver as claimed in claim 16, wherein: said detecting means comprises:
said logic means responsive to said receiver clock pulses for carrying out logic operation in accordance with first majority decision logic to receive said general call number signal and to detect said specific call number signal only when said receiver clock pulses are counted to a first predetermined number during presence of each bit of said general call number signal; and
second logic means responsive to said receiver clock pulses for carrying out logic operation in accordance with second majority decision logic to receive said message signal only when said receiver clock pulses are counted to a second predetermined number during presence of each bit of said message signal, said second predetermined number being less than said first predetermined number.

18. A pager receiver as claimed in claim 16, wherein: said supplying means further comprises means responsive to said clock pulse sequence for producing, as said receiver clock pulses, a first and a second clock pulse sequence at a first and a second local clock rate which are equal to m times said first and said second transmission rates, respectively, where m is an integer which is not greater than N;

said detecting means comprising means responsive to said first local clock pulse sequence and said reception calling signal for carrying out logic operation in accordance with predetermined majority decision logic to receive said general call number signal and to detect said specific number signal only when pulses of said first local clock pulse sequence are counted during presence of each bit of said general call number signal to a preselected number which is not greater than said integer;

said reproducing means comprising means responsive to said second local clock pulse sequence and said reception calling signal for carrying out logic operation in accordance with said predetermined majority decision logic to receive said message signal only when pulses of said second local clock pulse sequence are counted to said preselected number during presence of each bit of said message signal.

* * * * *

UNITED STATES PATENT AND TRADEMARK OFFICE
CERTIFICATE OF CORRECTION

PATENT NO. : 4,618,860

DATED : October 21, 1986

INVENTOR(S) : Toshihiro Mori

It is certified that error appears in the above-identified patent and that said Letters Patent is hereby corrected as shown below:

Column 2, line 31    After "Substation" insert --from the base station--

Column 2, line 32    Delete "from"

Column 2, line 33    Delete "the base station"

Column 3, line 40    After "information" delete ","

Column 8, line 23    Delete " "034541111 2002" " and insert --"0345411112001"--

Column 8, line 28    Delete "date" and insert --data--

Column 14, line 48   Delete "after detection" (second occurrence)

Column 16, line 22   Delete "reassigned" and insert --preassigned--

UNITED STATES PATENT AND TRADEMARK OFFICE
CERTIFICATE OF CORRECTION

PATENT NO. : 4,618,860

DATED : October 21, 1986

INVENTOR(S) : Toshihiro Mori

It is certified that error appears in the above-identified patent and that said Letters Patent is hereby corrected as shown below:

Column 26, line 47, Delete "said" and insert -- first -- (first occurrence)

Signed and Sealed this

Twenty-eighth Day of April, 1987

*Attest:*

DONALD J. QUIGG

*Attesting Officer*  *Commissioner of Patents and Trademarks*